United States Patent
Li et al.

(10) Patent No.: US 10,783,794 B2
(45) Date of Patent: Sep. 22, 2020

(54) AERIAL IMAGE ACQUISITION METHOD AND SYSTEM FOR INVESTIGATING TRAFFIC ACCIDENT SITE BY UNMANNED AERIAL VEHICLE

(71) Applicant: SUN YAT-SEN UNIVERSITY, Guangzhou (CN)

(72) Inventors: Xiying Li, Guangzhou (CN); Sijia Chen, Guangzhou (CN)

(73) Assignee: SUN YAT-SEN UNIVERSITY, Guangzhou, Guangdong (CN)

( * ) Notice: Subject to any disclaimer, the term of this patent is extended or adjusted under 35 U.S.C. 154(b) by 59 days.

(21) Appl. No.: 15/763,435

(22) PCT Filed: Sep. 19, 2017

(86) PCT No.: PCT/CN2017/102221
§ 371 (c)(1),
(2) Date: Mar. 26, 2018

(87) PCT Pub. No.: WO2018/103408
PCT Pub. Date: Jun. 14, 2018

(65) Prior Publication Data
US 2020/0066169 A1  Feb. 27, 2020

(30) Foreign Application Priority Data

Dec. 9, 2016  (CN) .......................... 2016 1 1129001

(51) Int. Cl.
*G05D 1/00* (2006.01)
*B64C 39/02* (2006.01)
(Continued)

(52) U.S. Cl.
CPC ......... *G08G 5/0078* (2013.01); *G01C 11/025* (2013.01); *G05D 1/0094* (2013.01); *G05D 1/101* (2013.01); *H04N 13/221* (2018.05)

(58) Field of Classification Search
CPC .. G05D 1/101; G05D 1/0094; H04N 5/23203; H04N 13/221; G01C 11/025; G08G 5/0078
(Continued)

(56) References Cited

U.S. PATENT DOCUMENTS

2009/0021423 A1  1/2009  Cheng et al.
2012/0075461 A1  3/2012  Yu et al.
(Continued)

FOREIGN PATENT DOCUMENTS

CN  104714557 A  6/2015
CN  104881037 A  9/2015
(Continued)

OTHER PUBLICATIONS

Chinese First Office Action for Patent Application No. 201611129001.1 dated Jul. 27, 2018, 7 pages.
(Continued)

*Primary Examiner* — Albert Kir
(74) *Attorney, Agent, or Firm* — Davis Wright Tremaine LLP (57) ABSTRACT

Disclosed are an aerial image acquisition method and a system for investigating a traffic accident site by an unmanned aerial vehicle. The method comprises selecting a corresponding unmanned aerial vehicle low-altitude shooting scheme of traffic accident site according to whether three-dimensional site reconstruction or site animation simulation is needed; selecting and calculating shooting parameters of the unmanned aerial vehicle according to the unmanned aerial vehicle low-altitude shooting scheme selected; and shooting the traffic accident site according to the unmanned aerial vehicle low-altitude shooting scheme selected and the shooting parameters of the unmanned aerial vehicle, to obtain an aerial image sequence of the traffic accident site.

8 Claims, 4 Drawing Sheets

(51) Int. Cl.
*G08G 5/00* (2006.01)
*H04N 13/221* (2018.01)
*G01C 11/02* (2006.01)
*G05D 1/10* (2006.01)

(58) Field of Classification Search
USPC ........................................................ 348/46
See application file for complete search history.

(56) References Cited

U.S. PATENT DOCUMENTS

2014/0316616 A1* 10/2014 Kugelmass ............ G05D 1/101
 701/8
2015/0145954 A1 5/2015 Pulleti et al.
2016/0241767 A1* 8/2016 Cho ................... H04N 5/23203

FOREIGN PATENT DOCUMENTS

| CN | 105045279 A | 11/2015 |
| CN | 105629980 A | 6/2016 |
| CN | 105721751 A | 6/2016 |
| CN | 106767706 A | 5/2017 |

OTHER PUBLICATIONS

International Search Report and Written Opinion dated Dec. 26, 2017, International Patent Application No. PCT/CN2017/102221, filed Sep. 19, 2017, 5 pages.

* cited by examiner

AERIAL IMAGE ACQUISITION METHOD AND SYSTEM FOR INVESTIGATING TRAFFIC ACCIDENT SITE BY UNMANNED AERIAL VEHICLE

TECHNICAL FIELD

The present invention relates to the field of unmanned aerial vehicles, and more particularly, to an aerial image acquisition method and a system for investigating a traffic accident site by an unmanned aerial vehicle.

BACKGROUND

According to a conventional method for investigating a road traffic accident site, a traffic police mainly records the geometrical information of the accident site through distance measurement by a measuring tool, observation and judgment, manual drawing and other simple methods, so as to achieve the investigation purpose. These conventional methods have the defects of low efficiency, bad accuracy and incapability of conducting secondary verification to the accident site, and cannot meet the increasingly high requirement of people. However, strong judgment basis can be provided to liability judgment, reasonable analysis, settlement of insurance claim and judicial expertise based on reappearance method of the live-action to the traffic accident site, and more social value is generated. Therefore, using various auxiliary investigation technologies to form a reappearable accident site becomes the development trend of the road traffic accident site investigation.

According to different levels of information obtained, the road traffic accident site investigation can be divided into two-dimensional investigation and three-dimensional investigation. The traffic factors of the accident site in actual application may not be on the same plane, which cannot meet the requirement of the two-dimensional investigation usually, and so as to cause a bigger error due to the two-dimensional investigation; however, the three-dimensional investigation can effectively reduce and basically eliminate this error, so as to reduce the effects of different traffic factors on the measurement results due to the height reasons. The three-dimensional investigation can be divided into a traffic accident site surveying and mapping technology and a traffic accident three-dimensional reconstruction technology according to the technical means and presenting modes.

The traffic accident site surveying and mapping technology refers to investigating and recording the information and status of the site traffic factors based on the actual site conditions, presenting the information and status by the accident site drawing mode, concerning the actual results only, and not concluding the accident reason and process. The traffic accident site surveying and mapping technology can also be divided into a monocular camera investigation method and a multi-view camera investigation method according to the quantity of the surveying and mapping cameras in the site. However, since the traffic accident site has uncertainty and it is difficult to calibrate the camera for multiple times in real time, the traffic accident site surveying and mapping technology still needs to be further improved on the aspect of measurement accuracy.

The three-dimensional reconstruction technology of the traffic accident site comprises the three-dimensional reconstruction of site and process animation simulation process. The three-dimensional reconstruction method of the traditional traffic accident site comprises a manual measuring method, a three-dimensional laser scanning method, and photogrammetry, and the aerial camera can also be used to shoot the road conditions from high altitude. The traditional manual measuring method consumes long time for drawing modeling, and the effects thereof have greater difference with the actual conditions. Therefore, the traditional manual measuring method can only be used for overview reappearance of the site, and cannot show many details. Both the three-dimensional laser scanning method and the photogrammetry request that equipment can measure around the accident site, but in this case the movement efficiency is low, and the corresponding equipment which is relatively heavy is generally loaded on a measuring car and cannot implement around measurement on many sites. Helicopter shooting is usually used in current aerial shooting, which has the defects that are not applied to the reconstruction of the road traffic accident site, including high shooting height, unapparent object feature and poor modeling effect. In addition, there are also researches on shooting the site by an unmanned aerial vehicle currently, but only simple site scanning shooting at a certain height is conducted, and only the general picture (i.e., site picture) of the site shot at an overlooked view can be obtained. The actual view of the site cannot be shown in three-dimension yet.

SUMMARY

In order to solve the technical problems above, an object of the disclosure aims at providing an aerial image acquisition method for investigating a traffic accident site by an unmanned aerial vehicle with good motility, high efficiency, comprehensiveness and high accuracy.

Another object of the disclosure aims at providing an aerial image acquisition system for investigating a traffic accident site by an unmanned aerial vehicle with good motility, high efficiency, comprehensiveness and high accuracy.

The technical solution adopted in the disclosure is as follows.

An aerial image acquisition method for investigating a traffic accident site by an unmanned aerial vehicle, comprises the following steps of:

selecting a corresponding unmanned aerial vehicle low-altitude shooting scheme of traffic accident site according to whether three-dimensional site reconstruction or site animation simulation is needed, wherein the unmanned aerial vehicle low-altitude shooting scheme of traffic accident site includes but is not limited to a global-scope "S-shaped" itinerant vertical high-angle shooting scheme and a combined shooting scheme, and the combined shooting scheme is formed by superimposing the global-scope "S-shaped" itinerant vertical high-angle shooting scheme with a partial three-dimensional site multilevel surrounding inclined shooting scheme;

selecting and calculating shooting parameters of the unmanned aerial vehicle according to the unmanned aerial vehicle low-altitude shooting scheme selected; and shooting the traffic accident site according to the unmanned aerial vehicle low-altitude shooting scheme selected and the shooting parameters of the unmanned aerial vehicle, to obtain an aerial image sequence of the traffic accident site.

Further, the step of selecting a corresponding unmanned aerial vehicle low-altitude shooting scheme of traffic accident site according to whether three-dimensional site reconstruction or site animation simulation is needed comprises:

S11: judging whether three-dimensional site reconstruction or site animation simulation is needed to select a corresponding traffic accident site, and implementing step S13 if three-dimensional site reconstruction or site animation simulation is needed; otherwise, implementing S12;

S12: selecting the global-scope "S-shaped" itinerant vertical high-angle shooting scheme as the unmanned aerial vehicle low-altitude shooting scheme of traffic accident site; and S13: selecting the combined shooting scheme as the unmanned aerial vehicle low-altitude shooting scheme of traffic accident site.

Further, the step of selecting and calculating shooting parameters of the unmanned aerial vehicle according to the unmanned aerial vehicle low-altitude shooting scheme selected comprises:

S21: selecting and calculating the shooting parameters of the unmanned aerial vehicle according to the global-scope "S-shaped" itinerant vertical high-angle shooting scheme;

S22: judging whether the unmanned aerial vehicle low-altitude shooting scheme is the combined shooting scheme, and implementing step S23 if the unmanned aerial vehicle low-altitude shooting scheme is the combined shooting scheme; otherwise, shooting the traffic accident site; and S23: selecting and calculating the shooting parameters of the unmanned aerial vehicle according to the partial three-dimensional site multilevel surrounding inclined shooting scheme.

Further, the step S21 comprises:

setting a height $H_0$ and a shooting interval $T_0$ of an aerial camera of the unmanned aerial vehicle;

respectively calculating a projected length of a long side of the aerial image on the ground and a projected length of a short-side of the aerial image on the ground according to the height $H_0$ of the aerial camera of the unmanned aerial vehicle, a viewing angle of the camera and a ratio of the long side to the short side of the aerial image;

calculating a flight velocity $V_0$ of the aerial camera of the unmanned aerial vehicle according to the height $H_0$, the shooting interval $T_0$ and an overlap ratio of front and back images in a course direction;

calculating a horizontal flight course interval Do according to the height $H_0$ and the overlap ratio of images on a horizontal interval flight course; and calculating shooting time T and a shooting image quantity S of a region to be shot according to the shooting interval $T_0$, the flight velocity $V_0$ and the horizontal flight course interval $D_0$, wherein a calculation formula of the shooting time T is:

$$T = \frac{a^* \left( \left\lceil \frac{b}{D_0} \right\rceil + 1 \right) + b}{V_0},$$

and a calculation formula of the shooting image quantity S is:

$$S = \left\lceil \frac{T}{T_0} \right\rceil,$$

wherein a and b are respectively a length of a flight course side and a length of a horizontal side of the region to be shot, and ⌈ ⌉ is a symbol rounding up to an integer.

Further, the step S23 comprises:

setting four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

calculating four shooting angles $\theta_1$, $\theta_2$, $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and calculating four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

Further, the step of shooting the traffic accident site according to the unmanned aerial vehicle low-altitude shooting scheme and the shooting parameters of the unmanned aerial vehicle, to obtain an aerial image sequence of the traffic accident site comprises:

S31: shooting the traffic accident site according to the global-scope "S-shaped" itinerant vertical high-angle shooting scheme and the shooting parameters of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

S32: judging whether the unmanned aerial vehicle low-altitude shooting scheme selected is the combined shooting scheme, and implementing step S33 if the unmanned aerial vehicle low-altitude shooting scheme selected is the combined shooting scheme; otherwise, ending the acquisition procedure and using the horizontally-spaced photograph group shot at an overlooked view as the aerial image sequence of the traffic accident site; and S33: shooting the traffic accident site according to the partial three-dimensional site multilevel surrounding inclined shooting scheme and the shooting parameters of the unmanned aerial vehicle, to obtain a photograph group with different heights and different radiuses, combining the horizontally-spaced photograph group shot at an overlooked view and the photograph group with different heights and different radiuses into the aerial image sequence of the traffic accident site, operating the unmanned aerial vehicle to fly above a target object according to the partial three-dimensional site multilevel surrounding inclined shooting scheme firstly, and then shooting around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

Another technical solution adopted in the disclosure is as follows.

An aerial image acquisition system for investigating a traffic accident site by an unmanned aerial vehicle comprises:

a shooting scheme selector, configured to select a corresponding unmanned aerial vehicle low-altitude shooting scheme of traffic accident site according to whether three-dimensional site reconstruction or site animation simulation is needed, wherein the unmanned aerial vehicle low-altitude shooting scheme of traffic accident site includes but is not limited to a global-scope "S-shaped" itinerant vertical high-angle shooting scheme and a combined shooting scheme, and the combined shooting scheme is formed by combining the global-scope "S-shaped" itinerant vertical high-angle shooting scheme with a partial three-dimensional site multilevel surrounding inclined shooting scheme;

a parameter calibration module, configured to select and calculate shooting parameters of the unmanned aerial vehicle according to the unmanned aerial vehicle low-altitude shooting scheme selected; and a site shooting module, configured to shoot the traffic accident site according to the unmanned aerial vehicle low-altitude shooting scheme selected and the shooting parameters of the unmanned aerial vehicle, to obtain an aerial image sequence of the traffic accident site.

Further, the parameter calibration module comprises:

a first calibration circuit, configured to select and calculate the shooting parameters of the unmanned aerial vehicle according to the global-scope "S-shaped" itinerant vertical high-angle shooting scheme;

a first judgment circuit, configured to judge whether the unmanned aerial vehicle low-altitude shooting scheme is the combined shooting scheme, and swift to a second calibration circuit, if the unmanned aerial vehicle low-altitude shooting scheme is the combined shooting scheme; otherwise, swift to the site shooting module; and a second calibration circuit, configured to select and calculate the shooting parameters of the unmanned aerial vehicle according to the partial three-dimensional site multilevel surrounding inclined shooting scheme.

Further, the second calibration circuit, comprises:

a setting sub-circuit, configured to set four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

a first calculation sub-circuit, configured to calculate four shooting angles $\theta_1$, $\theta_2$ $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and a second calculation sub-circuit, configured to calculate four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

Further, the site shooting module comprises:

a first shooting circuit, configured to shoot the traffic accident site according to the global-scope "S-shaped" itinerant vertical high-angle shooting scheme and the shooting parameter of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

a second judging circuit is configured to judge whether the unmanned aerial vehicle low-altitude shooting scheme selected is the combined shooting scheme, implement step S33 if the unmanned aerial vehicle low-altitude shooting scheme selected is the combined shooting scheme; otherwise, end the acquisition procedure and use the horizontally-spaced photograph group shot at an overlooked view as the aerial image sequence of the traffic accident site; and a second shooting circuit, configured to shoot the traffic accident site according to the partial three-dimensional site multilevel surrounding inclined shooting scheme and the shooting parameters of the unmanned aerial vehicle, to obtain a photograph group with different heights and different radiuses, combine the horizontally-spaced photograph group shot at an overlooked view and the photograph group with different heights and different radiuses into the aerial image sequence of the traffic accident site, operate the unmanned aerial vehicle to fly above a target object according to the partial three-dimensional site multilevel surrounding inclined shooting scheme firstly, and then shoot around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

The beneficial effect of the method according to the disclosure: comprises the corresponding unmanned aerial vehicle low-altitude shooting scheme of traffic accident site according to whether three-dimensional site reconstruction or site animation simulation is needed, and the steps of selecting and calculating shooting parameters of the unmanned aerial vehicle according to the unmanned aerial vehicle low-altitude shooting scheme selected, and shooting the traffic accident site according to the unmanned aerial vehicle low-altitude shooting scheme selected and the shooting parameters of the unmanned aerial vehicle, and the aerial image sequence is collected by the unmanned aerial vehicle, which gives give consideration to both the convenience and the motility; the unmanned aerial vehicle low-altitude shooting scheme of traffic accident site includes but is not limited to a global-scope "S-shaped" itinerant vertical high-angle shooting scheme and a combined shooting scheme, which not only can shoot the overall situation through the global-scope "S-shaped" itinerant vertical high-angle shooting scheme to obtain the site drawing at an overlooked view, but also can obtain the surrounding shooting image sequence with different angles and different levels through the partial three-dimensional site multilevel surrounding inclined shooting scheme in the combined shooting scheme, so as to realize multi-view comprehensive investigation to the traffic accident site, and provide sufficient data for the three-dimensional reconstruction or the actual view of the animation simulation accident site, and more comprehensively, the efficiency of obtaining evidence to the accident scene and the motility are greatly increased; and the aerial image acquisition is conducted by the unmanned aerial vehicle low-altitude shooting scheme, the shooting height is low, the defects that the feature of the aerial shooting object of helicopter is not obvious and the effect of modeling is not good are overcame, and the accuracy is higher.

The beneficial effect of the system according to the disclosure: comprises the shooting scheme selector, the parameter calibration module and the site shooting module, and the aerial image sequence is collected by the unmanned aerial vehicle, which gives give consideration to both the convenience and the motility; the unmanned aerial vehicle low-altitude shooting scheme of traffic accident site includes but is not limited to a global-scope "S-shaped" itinerant vertical high-angle shooting scheme and a combined shooting scheme, which not only can shoot the overall situation through the global-scope "S-shaped" itinerant vertical high-angle shooting scheme to obtain the site drawing at an overlooked view, but also can obtain the surrounding shooting image sequence with different angles and different levels through the partial three-dimensional site multilevel surrounding inclined shooting scheme in the combined shooting scheme, so as to realize multi-view comprehensive investigation to the traffic accident site, and provide sufficient data for the three-dimensional reconstruction or the actual view of the animation simulation accident site, and more comprehensively, the efficiency of obtaining evidence to the accident scene and the motility are greatly increased; and the aerial image acquisition is conducted by the unmanned aerial vehicle low-altitude shooting scheme, the shooting height is low, the defects that the feature of the aerial shooting object of helicopter is not obvious and the effect of modeling is not good are overcame, and the accuracy is higher.

DETAILED DESCRIPTION

Figure 1:
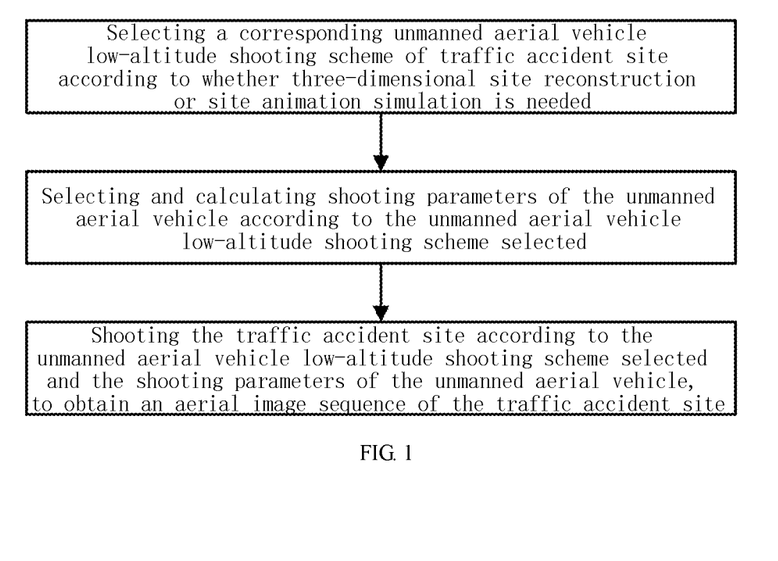
FIG. 1 is an overall flow chart of an aerial image acquisition method for investigating a traffic accident site by an unmanned aerial vehicle according to the disclosure.

Referring to FIG. 1, an aerial image acquisition method for investigating a traffic accident site by an unmanned aerial vehicle comprises the following steps of:

selecting a corresponding unmanned aerial vehicle low-altitude shooting scheme of traffic accident site according to whether three-dimensional site reconstruction or site animation simulation is needed, wherein the unmanned aerial vehicle low-altitude shooting scheme of traffic accident site includes but is not limited to a global-scope "S-shaped" itinerant vertical high-angle shooting scheme and a combined shooting scheme, and the combined shooting scheme is formed by superimposing the global-scope "S-shaped" itinerant vertical high-angle shooting scheme with a partial three-dimensional site multilevel surrounding inclined shooting scheme;

selecting and calculating shooting parameters of the unmanned aerial vehicle according to the unmanned aerial vehicle low-altitude shooting scheme selected; and shooting the traffic accident site according to the unmanned aerial vehicle low-altitude shooting scheme selected and the shooting parameters of the unmanned aerial vehicle, to obtain an aerial image sequence of the traffic accident site.

In that case, only the site drawing at an overlooked view is needed without needing the three-dimensional site reconstruction or site animation simulation. At this point, only the photograph group shot by the global-scope "S-shaped" itinerant vertical high-angle shooting scheme selected is needed to conduct quick modeling with low accuracy. Thus, the generated model can guarantee the modeling effect of bird's-eye view, and the information of the outline and line can basically satisfy the drawing requirement of the site drawing. The three-dimensional site reconstruction or site animation simulation is needed, which means that the site drawing at an overlooked view and the surrounding shooting image sequence with different angles and different levels are needed at the same time. At this point, the combined shooting scheme needs to be used: the photograph group shot by the global-scope "S-shaped" itinerant vertical high-angle shooting scheme selected is needed to conduct quick modeling with low accuracy, and the surrounding shooting image sequence of the partial three-dimensional site multi-level surrounding inclined shooting scheme is also needed to conduct the three-dimensional site reconstruction with high accuracy or the site animation simulation with high accuracy.

The existing quadrotor unmanned aerial camera is preferably selected as the unmanned aerial vehicle of the disclosure, and the air vehicle is provided with a camera.

Further, as a preferred embodiment, the step of selecting a corresponding unmanned aerial vehicle low-altitude shooting scheme of traffic accident site according to whether three-dimensional site reconstruction or site animation simulation is needed comprises:

S11, judging whether three-dimensional site reconstruction or site animation simulation is needed to select a corresponding traffic accident site, and implementing step S13 if three-dimensional site reconstruction or site animation simulation is needed; otherwise, implementing S12;

S12, selecting the global-scope "S-shaped" itinerant vertical high-angle shooting scheme as the unmanned aerial vehicle low-altitude shooting scheme of traffic accident site; and S13, selecting the combined shooting scheme as the unmanned aerial vehicle low-altitude shooting scheme of traffic accident site.

Further, as a preferred embodiment, the step of selecting and calculating shooting parameters of the unmanned aerial vehicle according to the unmanned aerial vehicle low-altitude shooting scheme selected comprises:

S21, selecting and calculating the shooting parameters of the unmanned aerial vehicle according to the global-scope "S-shaped" itinerant vertical high-angle shooting scheme;

S22, judging whether the unmanned aerial vehicle low-altitude shooting scheme is the combined shooting scheme, and implementing step S23 if the unmanned aerial vehicle low-altitude shooting scheme is the combined shooting scheme; otherwise, shooting the traffic accident site; and S23, selecting and calculating the shooting parameters of the unmanned aerial vehicle according to the partial three-dimensional site multilevel surrounding inclined shooting scheme.

Further, as a preferred embodiment, the step S21 comprises:

setting a height $H_0$ and a shooting interval $T_0$ of an aerial camera of the unmanned aerial vehicle;

respectively calculating a projected length of a long side of the aerial image on the ground and a projected length of a short-side of the aerial image on the ground according to the height $H_0$ of the aerial camera of the unmanned aerial vehicle, a viewing angle of the camera and a ratio of the long side to the short side of the aerial image;

calculating a flight velocity $V_0$ of the aerial camera of the unmanned aerial vehicle according to the height $H_0$, the shooting interval $T_0$ and an overlap ratio of front and back images in a course direction;

calculating a horizontal flight course interval Do according to the height $H_0$ and the overlap ratio of images on a horizontal interval flight course; and calculating shooting time T and a shooting image quantity S of a region to be shot according to the shooting interval $T_0$, the flight velocity $V_0$ and the horizontal flight course interval $D_0$, wherein a calculation formula of the shooting time T is:

$$T = \frac{a^* \left( \left\lfloor \frac{b}{D_0} \right\rfloor + 1 \right) + b}{V_0},$$

and a calculation formula of the shooting image quantity S is:

$$S = \left\lceil \frac{T}{T_0} \right\rceil,$$

wherein a and b are respectively a length of a flight course side and a length of a horizontal side of the region to be shot, and ⌈ ⌉ is a symbol rounding up to an integer.

Further, as a preferred embodiment, the step S23 comprises:

setting four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

calculating four shooting angles $\theta_1$, $\theta_2$, $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and calculating four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

Further, as a preferred embodiment, the step of shooting the traffic accident site according to the unmanned aerial vehicle low-altitude shooting scheme and the shooting parameters of the unmanned aerial vehicle, to obtain an aerial image sequence of the traffic accident site comprises:

S31, shooting the traffic accident site according to the global-scope "S-shaped" itinerant vertical high-angle shooting scheme and the shooting parameters of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

S32, judging whether the unmanned aerial vehicle low-altitude shooting scheme selected is the combined shooting scheme, and implementing step S33 if the unmanned aerial vehicle low-altitude shooting scheme selected is the combined shooting scheme; otherwise, ending the acquisition procedure and using the horizontally-spaced photograph group shot at an overlooked view as the aerial image sequence of the traffic accident site; and S33, shooting the traffic accident site according to the partial three-dimensional site multilevel surrounding inclined shooting scheme and the shooting parameters of the unmanned aerial vehicle, to obtain a photograph group with different heights and different radiuses, combining the horizontally-spaced photograph group shot at an overlooked view and the photograph group with different heights and different radiuses into the aerial image sequence of the traffic accident site, operating the unmanned aerial vehicle to fly above a target object according to the partial three-dimensional site multilevel surrounding inclined shooting scheme firstly, and then shooting around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

Wherein the shooting conducted in a "S-shaped" horizontally-spaced itinerant manner at a fixed height refers to itinerant shooting conducted by the unmanned aerial vehicle at a fixed height with "S-shaped" track and fixed horizontal interval (the requirement on the overlap ratio of the horizontal interval flight course).

Figure 2:
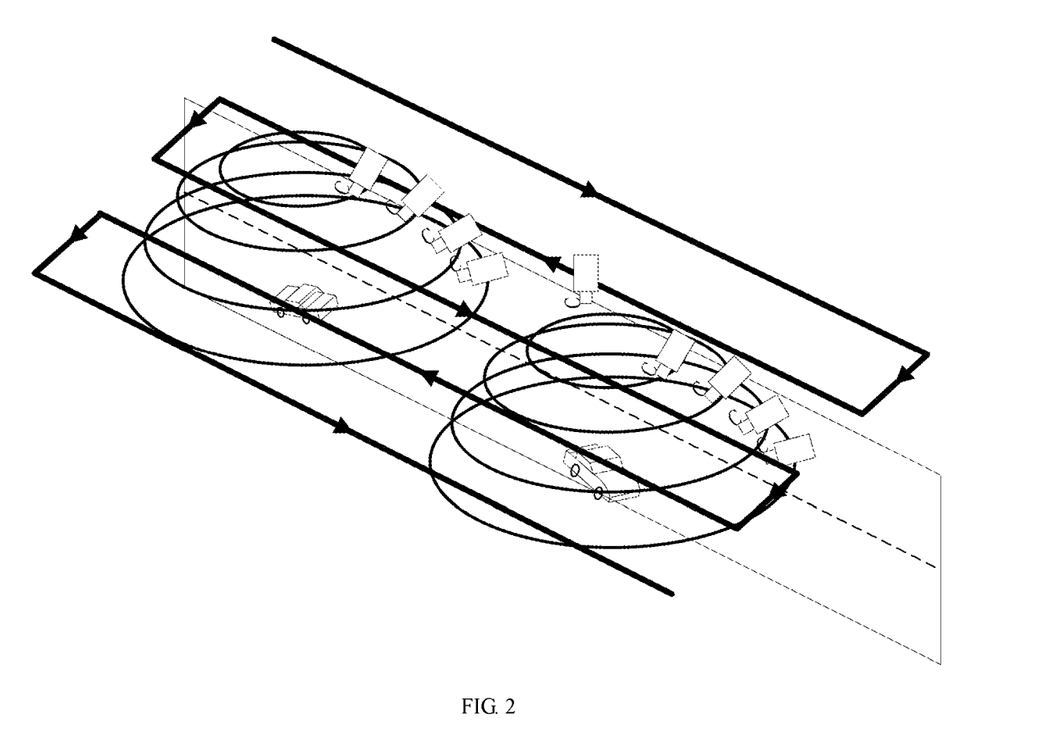
FIG. 2 is a schematic diagram of an aerial track of a combined shooting scheme of an unmanned aerial vehicle and a camera angle according to the disclosure.

Referring to FIG. 2, an aerial image acquisition system for investigating a traffic accident site by an unmanned aerial vehicle comprises:

a shooting scheme selector, configured to select a corresponding unmanned aerial vehicle low-altitude shooting scheme of traffic accident site according to whether three-dimensional site reconstruction or site animation simulation is needed, wherein the unmanned aerial vehicle low-altitude shooting scheme of traffic accident site includes but is not limited to a global-scope "S-shaped" itinerant vertical high-angle shooting scheme and a combined shooting scheme, and the combined shooting scheme is formed by combining the global-scope "S-shaped" itinerant vertical high-angle shooting scheme with a partial three-dimensional site multilevel surrounding inclined shooting scheme;

a parameter calibration module, configured to select and calculate shooting parameters of the unmanned aerial vehicle according to the unmanned aerial vehicle low-altitude shooting scheme selected; and a site shooting module, configured to shoot the traffic accident site according to the unmanned aerial vehicle low-altitude shooting scheme selected and the shooting parameters of the unmanned aerial vehicle, to obtain an aerial image sequence of the traffic accident site.

Further, as a preferred embodiment, the parameter calibration module comprises:

a first calibration circuit, configured to select and calculate the shooting parameters of the unmanned aerial vehicle according to the global-scope "S-shaped" itinerant vertical high-angle shooting scheme;

a first judgment circuit, configured to judge whether the unmanned aerial vehicle low-altitude shooting scheme is the combined shooting scheme, and swift to a second calibration circuit if the unmanned aerial vehicle low-altitude shooting scheme is the combined shooting scheme; otherwise, swift to the site shooting module; and a second calibration circuit, configured to select and calculate the shooting parameters of the unmanned aerial vehicle according to the partial three-dimensional site multilevel surrounding inclined shooting scheme.

Further, as a preferred embodiment, the second calibration circuit comprises:

a setting sub-circuit, configured to set four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

a first calculation sub-circuit, configured to calculate four shooting angles $\theta_1$, $\theta_2$ $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and a second calculation sub-circuit, configured to calculate four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

Further, as a preferred embodiment, the site shooting module comprises:

a first shooting circuit, configured to shoot the traffic accident site according to the global-scope "S-shaped" itinerant vertical high-angle shooting scheme and the shooting parameter of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

a second judging circuit is configured to judge whether the unmanned aerial vehicle low-altitude shooting scheme selected is the combined shooting scheme, implement step S33 if the unmanned aerial vehicle low-altitude shooting scheme selected is the combined shooting scheme; otherwise, end the acquisition procedure and use the horizontally-spaced photograph group shot at an overlooked view as the aerial image sequence of the traffic accident site; and a second shooting circuit, configured to shoot the traffic accident site according to the partial three-dimensional site multilevel surrounding inclined shooting scheme and the shooting parameters of the unmanned aerial vehicle, to obtain a photograph group with different heights and different radiuses, combine the horizontally-spaced photograph group shot at an overlooked view and the photograph group with different heights and different radiuses into the aerial image sequence of the traffic accident site, operate the unmanned aerial vehicle to fly above a target object according to the partial three-dimensional site multilevel surrounding inclined shooting scheme firstly, and then shoot around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

The disclosure is further described in detail hereinafter with reference to the drawings and the embodiments.

Embodiment 1

The existing mature investigation method mainly comprises a method of jointing the high-angle vertical aerial image and a method of aerial modeling to big regions by inclined photography with multiple lenses. The aerial shooting needs to be conducted at a higher height on the same plane by the two methods, which has bad motility, low efficiency, incomprehensiveness and low accuracy. For this purpose, in the combination of the basic features of the quadrotor aerial camera (one kind of unmanned aerial vehicles) and the method of obtaining evidence for the purpose of three-dimensional site reconstruction, the embodiment provides an aerial image acquisition method for investigating a traffic accident site by an unmanned aerial vehicle, the method formulates different aerial shooting tracks and shooting schemes at extremely low altitude regarding to the overall and partial situation. The aerial shooting investigation method is realized by the unmanned aerial vehicle, the efficiency of obtaining evidence of the accident site and motility are greatly increased, the advantage of ground close-range shooting method is expanded to the air, the multi-view comprehensive investigation is realized, and the application object of quickly generating the accident site drawing and conducting the three-dimensional site reconstruction or the site animation simulation can be realized in the combination of the computer software system. In addition, the method can also increase the accuracy of the three-dimensional reconstruction measurement value by restraining the three-dimensional calibration object in the site, and the specific method is that: the space relation in the modeling result is accurately restrained in the combination of the three-dimensional calibration object or/and the measurement result of the traditional method of the site ground staffs, and after the reasonable restraint is set and the error is confirmed to reach an acceptable scope, that is the accident site drawing is drawn according to the spatial measurement result of the modeling site, the continuous site locking and the continuous measurement are not needed. After the aerial image sequence acquisition of the traffic accident site in the embodiment is ended, the follow-up three-dimensional site modeling, the site animation simulation and other accident analysis operations can be conducted according to the collected aerial image sequence.

Figure 3:
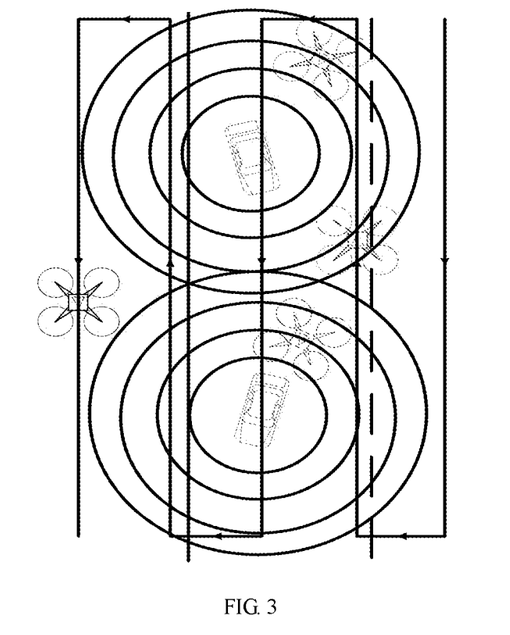
FIG. 3 is a top view of the aerial track of the combined shooting scheme of the unmanned aerial vehicle according to the disclosure.

The design object of the overall shooting scheme shall be that the overall top view diagram meets the completion of the plane investigation of the accident site. The important three-dimensional object (such as the accident car or the main traffic element) needs to meet the requirement of multi-angle observation after the three-dimensional reconstruction. The calibration object shall have the specific actual reference meaning in the modeling site (that is, the measurement value of the reestablished site is compared with the ground investigation result after the calibration object is restrained according to the reasonable ratio, and the actual reference value is needed). Therefore, the shooting scheme of the embodiment is designed with two basic shooting schemes: the first is a global-scope "S-shaped" itinerant vertical high-angle shooting scheme, and the second is the partial three-dimensional site multilevel surrounding inclined shooting scheme. The two basic shooting schemes are superimposed to form the combined shooting scheme of the disclosure, and the shooting method and the shooting angle of the camera are respectively shown in FIG. 2 and FIG. 3. The two basic shooting schemes are described in detail as follows.

(I) The Global-Scope "S-Shaped" Itinerant Vertical High-Angle Shooting Scheme.

Figure 4:
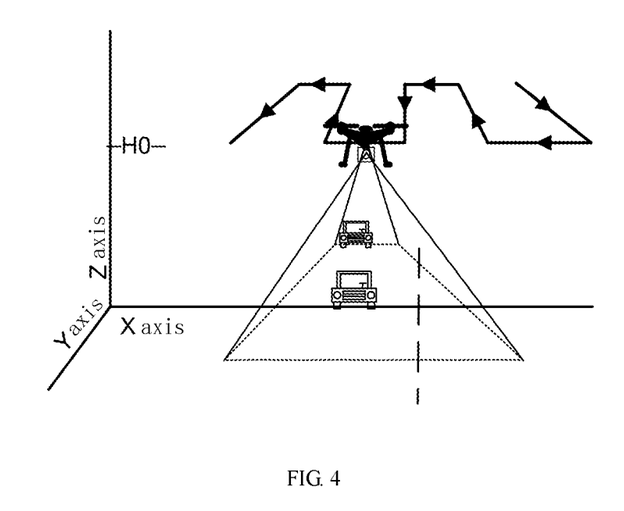
FIG. 4 is a schematic diagram of the track of global-scope "S-shaped" horizontally-spaced vertical high-angle shooting by the unmanned aerial vehicle according to the disclosure.
Figure 5:
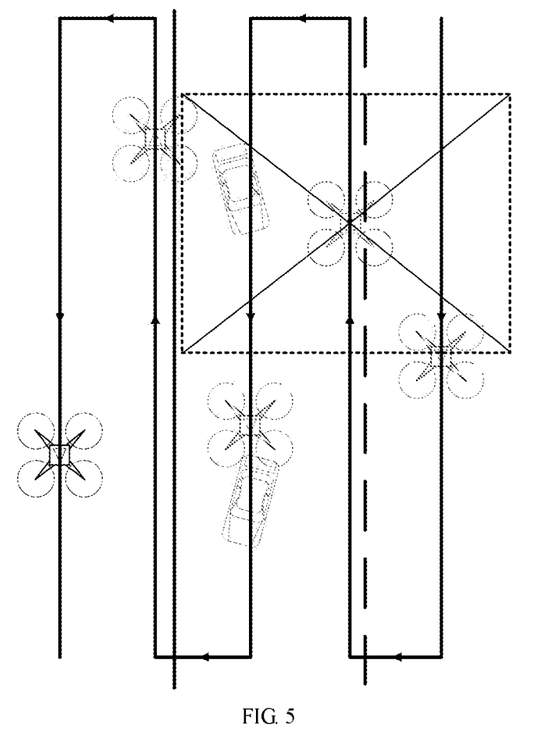
FIG. 5 is a top view of the track of the global-scope "S-shaped" horizontally-spaced vertical high-angle shooting by the unmanned aerial vehicle according to the disclosure.

Regarding to the global-scope shooting, the shooting method is as shown in FIGS. 4 and 5, the shooting is conducted according to the aerial track of the quadrotor unmanned aerial camera in a "S-shaped" horizontally-spaced itinerant manner at a fixed height, the angle of the camera is vertically downward, and the quadrotor unmanned aerial camera moves at a constant velocity. The overlap ratio $O_{fa}$ of two photos at front and back in the flight direction shall keep more than 50% (i.e., $O_{fa}>=50\%$), and the overlap ratio $O_{lr}$ of two neighboring flight strips, i.e., photos on the flight direction shall keep more than 60% (i.e., $O_h \geq 60\%$). Since the flight height is relatively low, the image sequence obtained by this method is mainly related to the flight height, horizontal flight course interval, flight direction flight velocity and shooting interval. In order to meet more than 50% superposition of images at front and back in the flight direction and more than 60% superposition in the horizontal direction, the flight height $H_0$, the flight velocity $V_0$, the shooting interval $T_0$ and the horizontal flight course interval $D_0$ need to be set. Regarding to the actual operation feasibility of the quadrotor unmanned aerial camera, the flight height $H_0$ and the shooting interval $T_0$ are important setting parameters. Regarding to the camera of the quadrotor unmanned aerial camera, it is preferred to select 20 mm fixed focus wide-angle lens with about 94° visual angle, and considering the GPS error, the shaking of the quadrotor unmanned aerial camera, the deviation of the flight course and other actual conditions, the visual angle can be simplified to 90° for estimation, and the selection and calculation process of the corresponding shooting parameter specifically comprises the following contents.

(1) The flight height $H_0=10$ m and the shooting interval $T_0=2$s are set.

(2) If the calculation is conducted according to the ratio 4:3 of the long and short sides of the aerial photo and the visual angle 90°, the corresponding ground projection length of the long side of the aerial photo is $2H_0$, i.e., 20 m, and the corresponding ground projection length of the short side of the aerial photo is $1.5H_0$, i.e., 15 m.

(3) In order to guarantee that the superposition degree of the images at front and back in the flight direction is more than 50%, assuming that the flight direction does not have obvious deviation, and the quadrotor unmanned aerial camera forwardly flies along a straight line, the two images at front and back need more than $0.75H_0$ superposition in the flight direction. Since the shooting interval $T_0=2$s, the flight velocity $V_0$ of the quadrotor unmanned aerial camera can be limited to be:

$$0 < V_0 \leq \frac{0.75 H_0}{T_0} = 3.75 \text{ m/s}.$$

(4) In order to guarantee that the superposition degree of the images on the horizontally-spaced flight course is more than 60%, assuming that all the quadrotor unmanned aerial cameras are on the same level to shoot, the horizontal flight course interval $D_0$ shall meet: $0 < D_0 \leq 1.2 H_0 = 12$ m.

(5) Regarding to the region to be shot with side length of the flight course a, the horizontal side length b, and the scope a*b, the shooting time $$T = \frac{a^* \left( \left\lfloor \frac{b}{D_0} \right\rfloor + 1 \right) + b}{V_0},$$

and the shooting interval $T_0=2$s. Therefore, the shooting image quantity $$S = \left\lceil \frac{T}{T_0} \right\rceil.$$

Assuming that a=96 m and b=48 m, then $$T = \frac{96*4 + 48}{3.75} = 115.2s \text{ and } S = 58.$$

Figure 6:
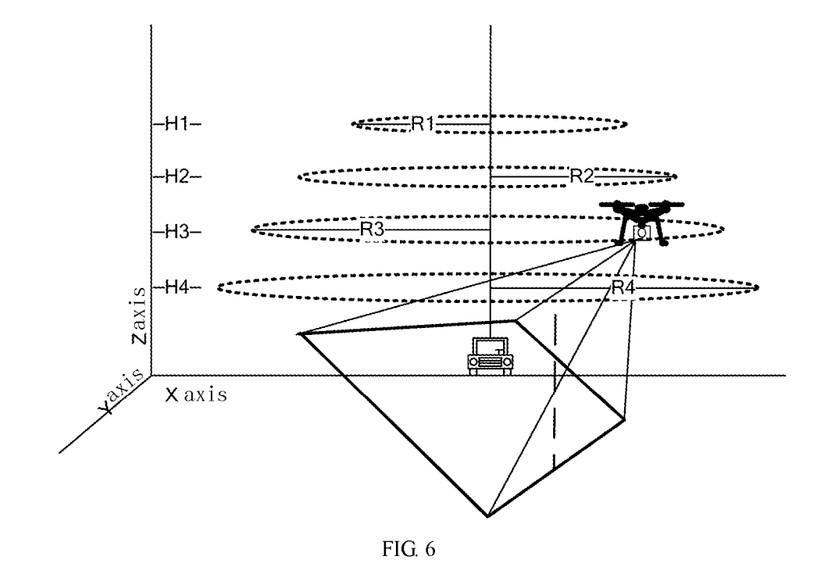
FIG. 6 is a schematic diagram of the track of partial multi-angle surrounding inclined shooting by the unmanned aerial vehicle according to the disclosure.
Figure 7:
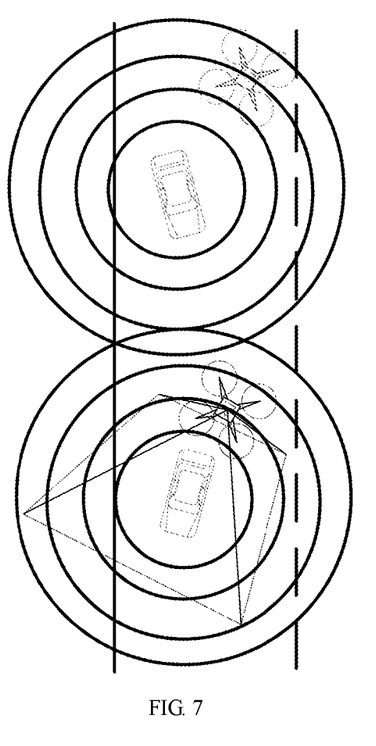
FIG. 7 is a top view of the track of the partial multi-angle surrounding inclined shooting by the unmanned aerial vehicle according to the disclosure.

(II) The Partial Three-Dimensional Site Multilevel Surrounding Inclined Shooting Scheme Regarding to the partial three-dimensional site shooting scheme with the purpose of the three-dimensional site reconstruction (i.e., three-dimensional modeling or animation simulation), the shooting method is that: the quadrotor unmanned aerial camera is operated to fly above the target object (comprising the car and the calibration object of the checkerboard in front of the car), a central point is determined, and then shooting is conducted in a surrounding and inclined manner around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center. According to different height of aerial track and the surrounding radius, the angle of the camera (i.e., the included angles between an optical axis of the camera and the perpendicular line of the ground: $\theta_1$, $\theta_2$, $\theta_3$ and $\theta_4$) is also distinguished. The shooting intervals $D_1$, $D_2$, $D_3$ and $D_4$ also need to be determined according to the designed flight heights $H_1$, $H_2$, $H_3$ and $H_4$, the surrounding radiuses $R_1$, $R_2$, $R_3$ and $R_4$ and the designed flight velocities $V_1$, $V_2$, $V_3$ and $V_4$ in site operation. In order to reach the visual requirement on site reconstruction, each height can be set as collecting at least 32 images to meet the requirement on the three-dimensional reconstruction.

The general shooting procedure of the partial three-dimensional site multilevel surrounding inclined shooting scheme is to enable the quadrotor unmanned aerial camera to shoot around the calibration object in a surrounding manner, so as to obtain four groups of photos according to four heights and four radiuses. Moreover, in order to increase the modeling effect of the target region, after the embodiment using the quadrotor unmanned aerial camera to shoot the target region in a surrounding manner (i.e., the car and the calibration object of the checkerboard in front of the car) to obtain four groups of photos, a group of photos can also be additionally shot according to a larger radius at a lowest height in the four heights. That is to say, five groups of photos are obtained by the partial three-dimensional site multilevel surrounding inclined shooting scheme according to four heights and five radiuses.

If setting $H_1=11$ m, $R_1=5$ m; $H_2=9$ m, $R_2=7$ m; $H_3=7$ m, $R_3=9$ m; $H_4=5$ m, $R_4=5$ m; and $H_4=5$ m, $R_5=11$ m, the quantity of image through screening is shown in Table 1:

TABLE 1

Quantity of shooting photos of target object and target region

|  | $H_1 = 11$ m $R_1 = 5$ m | $H_2 = 9$ m $R_2 = 7$ m | $H_3 = 7$ m $R_3 = 9$ m | $H_4 = 5$ m $R_4 = 5$ m | $H_4 = 5$ m $R_5 = 11$ m |
|---|---|---|---|---|---|
| Target object | 44 | 40 | 51 | 82 | — |
| Target region | 102 | 103 | 120 | 137 | 128 |

It should be recognized that embodiments in the disclosure can be implemented or embodied via computer hardware, a combination of both hardware and software, or by computer instructions stored in a non-transitory computer-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, the modules and circuits may be implemented in any type of computing platform that is operatively connected to a suitable tomography data scanning device, including but not limited to, personal computers, mini-computers, main-frames, workstations, networked or distributed computing environments, computer platforms separate, integral to, or in communication with charged particle tools or other processing devices, and the like.

Comparing with the prior art, the disclosure has the following advantages

1) The image sequence is collected by the unmanned aerial vehicle, which gives give consideration to both the convenience and the motility, can realize multi-view comprehensive investigation, and provides full data for three-dimensional reconstruction accident scene, so as to greatly increase the efficiency of obtaining evidence to the accident scene and the motility.

2) The combined shooting scheme gives the track scheme in global service and partial shooting. That is, the "S-shaped" track scanning method is used in high-angle shooting, and the peripheral surrounding track scanning with multiple heights and multiple radiuses is used in partial shooting, which is more comprehensive.

3) The image sequence acquisition method provided by the disclosure can be flexibly applied: if the site drawing at an overlooked view is needed only, only the photo group shot by the global-scope "S-shaped" itinerant vertical high-angle shooting scheme is needed to conduct quick modeling with low accuracy. Thus, the generated model can guarantee the modeling effect at a birds-eye view, and the basic information of the outline and the line can meet the drawing requirement on the site drawing; and if the three-dimensional reconstruction with high accuracy or the site animation simulation with high accuracy needs to be conducted, the combined shooting scheme is used.

4) The space relation in the modeling result is accurately restrained in the combination of the three-dimensional calibration object or/and the measurement result of the traditional method of the site ground staffs, and after the reasonable restraint is set and the error is confirmed to reach an acceptable scope, that is the accident site drawing is drawn according to the spatial measurement result of the modeling site, the continuous site locking and the continuous measurement are not needed, which is more convenient.

Although the preferred embodiments of the invention have been specifically described above, the invention is not limited thereto. Those skilled in the art can make various equivalent deformations or replacements without departing from the spirit of the invention, and these equivalent deformations or replacements shall fall into the scope defined by the claims of the application.

The invention claimed is:

1. An aerial image acquisition method for investigating a traffic accident site by an unmanned aerial vehicle, comprising the steps of:

selecting a corresponding unmanned aerial vehicle low-altitude shooting scheme of traffic accident site according to whether three-dimensional site reconstruction or site animation simulation is needed, the unmanned aerial vehicle low-altitude shooting scheme of traffic accident site including a global-scope "S-shaped" itinerant vertical high-angle shooting scheme and a combined shooting scheme, and the combined shooting scheme being formed by superimposing the global-scope "S-shaped" itinerant vertical high-angle shooting scheme with a partial three-dimensional site multilevel surrounding inclined shooting scheme;

selecting and calculating shooting parameters of the unmanned aerial vehicle according to the unmanned aerial vehicle low-altitude shooting scheme selected, comprising:

S21, selecting and calculating the shooting parameters of the unmanned aerial vehicle according to the global-scope "S-shaped" itinerant vertical high-angle shooting scheme;

S22, judging whether the unmanned aerial vehicle low-altitude shooting scheme is the combined shooting scheme, and implementing step S23 if the unmanned aerial vehicle low-altitude shooting scheme is the combined shooting scheme, otherwise shooting the traffic accident site; and S23, selecting and calculating the shooting parameters of the unmanned aerial vehicle according to the partial three-dimensional site multilevel surrounding inclined shooting scheme;

shooting the traffic accident site according to the unmanned aerial vehicle low-altitude shooting scheme selected and the shooting parameters of the unmanned aerial vehicle, to obtain an aerial image sequence of the traffic accident site, wherein the step S21 comprises:

setting a height $H_0$ and a shooting interval $T_0$ of an aerial camera of the unmanned aerial vehicle;

respectively calculating a projected length of a long side of the aerial image on the ground and a projected length of a short-side of the aerial image on the ground according to the height $H_0$ of the aerial camera of the unmanned aerial vehicle, a viewing angle of the camera and a ratio of the long side to the short side of the aerial image;

calculating a flight velocity $V_0$ of the aerial camera of the unmanned aerial vehicle according to the height $H_0$, the shooting interval $T_0$ and an overlap ratio of front and back images in a course direction;

calculating a horizontal flight course interval $D_0$ according to the height $H_0$ and the overlap ratio of images on a horizontal interval flight course; and calculating shooting time T and a shooting image quantity S of a region to be shot according to the shooting interval $T_0$, the flight velocity $V_0$ and the horizontal flight course interval $D_0$, wherein a calculation formula of the shooting time T is:

$$T = \frac{a*\left(\left\lfloor \frac{b}{D_0} \right\rfloor + 1\right) + b}{V_0},$$

and a calculation formula of the shooting image quantity S is:

$$S = \left\lceil \frac{T}{T_0} \right\rceil,$$

wherein a and b are respectively a length of a flight course side and a length of a horizontal side of the region to be shot, and ⌈ ⌉ is a symbol rounding up to an integer.

2. The aerial image acquisition method for investigating a traffic accident site by an unmanned aerial vehicle according to claim 1, wherein the step of selecting a corresponding unmanned aerial vehicle low-altitude shooting scheme of traffic accident site according to whether three-dimensional site reconstruction or site animation simulation is needed comprises:

S11, judging whether three-dimensional site reconstruction or site animation simulation is needed to select a corresponding traffic accident site, and implementing step S13 if three-dimensional site reconstruction or site animation simulation is needed, otherwise implementing S12;

S12, selecting the global-scope "S-shaped" itinerant vertical high-angle shooting scheme as the unmanned aerial vehicle low-altitude shooting scheme of traffic accident site; and S13, selecting the combined shooting scheme as the unmanned aerial vehicle low-altitude shooting scheme of traffic accident site.

3. The aerial image acquisition method for investigating a traffic accident site by an unmanned aerial vehicle according to claim 1, wherein the step S23 comprises:

setting four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

calculating four shooting angles $\theta_1$, $\theta_2$, $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and calculating four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

4. The aerial image acquisition method for investigating a traffic accident site by an unmanned aerial vehicle according to claim 1, wherein the step S23 comprises:

setting four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;

calculating four shooting angles $\theta_1$, $\theta_2$, $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and calculating four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

5. The aerial image acquisition method for investigating a traffic accident site by an unmanned aerial vehicle according to claim 3, wherein the step of shooting the traffic accident site according to the unmanned aerial vehicle low-altitude shooting scheme and the shooting parameters of the unmanned aerial vehicle, to obtain an aerial image sequence of the traffic accident site comprises:

S31, shooting the traffic accident site according to the global-scope "S-shaped" itinerant vertical high-angle shooting scheme and the shooting parameters of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

S32, judging whether the unmanned aerial vehicle low-altitude shooting scheme selected is the combined shooting scheme, and implementing step S33 if the unmanned aerial vehicle low-altitude shooting scheme selected is the combined shooting scheme; otherwise, ending the acquisition procedure and using the horizontally-spaced photograph group shot at an overlooked view as the aerial image sequence of the traffic accident site; and S33, shooting the traffic accident site according to the partial three-dimensional site multilevel surrounding inclined shooting scheme and the shooting parameters of the unmanned aerial vehicle, to obtain a photograph group with different heights and different radiuses, combining the horizontally-spaced photograph group shot at an overlooked view and the photograph group with different heights and different radiuses into the aerial image sequence of the traffic accident site, operating the unmanned aerial vehicle to fly above a target object according to the partial three-dimensional site multilevel surrounding inclined shooting scheme firstly, and then shooting around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

6. The aerial image acquisition method for investigating a traffic accident site by an unmanned aerial vehicle according to claim 4, wherein the step of shooting the traffic accident site according to the unmanned aerial vehicle low-altitude shooting scheme and the shooting parameters of the unmanned aerial vehicle, to obtain an aerial image sequence of the traffic accident site comprises:

S31, shooting the traffic accident site according to the global-scope "S-shaped" itinerant vertical high-angle shooting scheme and the shooting parameters of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;

S32, judging whether the unmanned aerial vehicle low-altitude shooting scheme selected is the combined shooting scheme, and implementing step S33 if the unmanned aerial vehicle low-altitude shooting scheme selected is the combined shooting scheme; otherwise, ending the acquisition procedure and using the horizontally-spaced photograph group shot at an overlooked view as the aerial image sequence of the traffic accident site; and S33, shooting the traffic accident site according to the partial three-dimensional site multilevel surrounding inclined shooting scheme and the shooting parameters of the unmanned aerial vehicle, to obtain a photograph group with different heights and different radiuses, combining the horizontally-spaced photograph group shot at an overlooked view and the photograph group with different heights and different radiuses into the aerial image sequence of the traffic accident site, operating the unmanned aerial vehicle to fly above a target object according to the partial three-dimensional site multilevel surrounding inclined shooting scheme firstly, and then shooting around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

7. An aerial image acquisition system for investigating a traffic accident site by an unmanned aerial vehicle, comprising:
  a shooting scheme selection module, configured to select a corresponding unmanned aerial vehicle low-altitude shooting scheme of traffic accident site according to whether three-dimensional site reconstruction or site animation simulation is needed, wherein the unmanned aerial vehicle low-altitude shooting scheme of traffic accident site includes but is not limited to a global-scope "S-shaped" itinerant vertical high-angle shooting scheme and a combined shooting scheme, and the combined shooting scheme is formed by combining the global-scope "S-shaped" itinerant vertical high-angle shooting scheme with a partial three-dimensional site multilevel surrounding inclined shooting scheme;
  a parameter calibration module, configured to select and calculate shooting parameters of the unmanned aerial vehicle according to the unmanned aerial vehicle low-altitude shooting scheme selected, wherein the calibration module comprises:
    a first calibration circuit, configured to select and calculate the shooting parameters of the unmanned aerial vehicle according to the global-scope "S-shaped" itinerant vertical high-angle shooting scheme;
    a first judgment circuit, configured to judge whether the unmanned aerial vehicle low-altitude shooting scheme is the combined shooting scheme, and swift to a second calibration circuit if the unmanned aerial vehicle low-altitude shooting scheme is the combined shooting scheme; otherwise, swift to the site shooting module; and
    a second calibration circuit, configured to select and calculate the shooting parameters of the unmanned aerial vehicle according to the partial three-dimensional site multilevel surrounding inclined shooting scheme; and
  a site shooting module, configured to shoot the traffic accident site according to the unmanned aerial vehicle low-altitude shooting scheme selected and the shooting parameters of the unmanned aerial vehicle, to obtain an aerial image sequence of the traffic accident site,
  wherein the second calibration circuit comprises:
    a setting sub-circuit, configured to set four heights $H_1$, $H_2$, $H_3$ and $H_4$ of a flight track of the unmanned aerial vehicle, four corresponding surrounding radiuses $R_1$, $R_2$, $R_3$ and $R_4$, and four corresponding flight velocities $V_1$, $V_2$, $V_3$ and $V_4$;
    a first calculation sub-circuit, configured to calculate four shooting angles $\theta_1$, $\theta_2$, $\theta_3$ and $\theta_4$ of the camera of the unmanned aerial vehicle according to the heights $H_1$, $H_2$, $H_3$ and $H_4$, and the corresponding surrounding radiuses $R_1$, $R_2$, $R_3$ and $R_4$; and
    a second calculation sub-circuit, configured to calculate four shooting intervals $D_1$, $D_2$, $D_3$ and $D_4$ of the unmanned aerial vehicle according to the heights $H_1$, $H_2$, $H_3$ and $H_4$, the corresponding surrounding radiuses $R_1$, $R_2$, $R_3$ and $R_4$, and the corresponding flight velocities $V_1$, $V_2$, $V_3$ and $V_4$.

8. The aerial image acquisition system for investigating a traffic accident site by an unmanned aerial vehicle according to claim 7, wherein the site shooting module comprises:
  a first shooting circuit, configured to shoot the traffic accident site according to the global-scope "S-shaped" itinerant vertical high-angle shooting scheme and the shooting parameter of the unmanned aerial vehicle, to obtain a horizontally-spaced photograph group at an overlooked view, wherein the aerial track of the unmanned aerial vehicle in global-scope "S-shaped" itinerant vertical high-angle shooting scheme is conducted in a "S-shaped" horizontally-spaced itinerant manner at a fixed height, the angle of the camera in the unmanned aerial vehicle is vertically downward, and the unmanned aerial vehicle moves at a constant velocity;
  a second judging circuit is configured to judge whether the unmanned aerial vehicle low-altitude shooting scheme selected is the combined shooting scheme, implement step S33 if the unmanned aerial vehicle low-altitude shooting scheme selected is the combined shooting scheme; otherwise, end the acquisition procedure and use the horizontally-spaced photograph group shot at an overlooked view as the aerial image sequence of the traffic accident site; and
  a second shooting circuit, configured to shoot the traffic accident site according to the partial three-dimensional site multilevel surrounding inclined shooting scheme and the shooting parameters of the unmanned aerial vehicle, to obtain a photograph group with different heights and different radiuses, combine the horizontally-spaced photograph group shot at an overlooked view and the photograph group with different heights and different radiuses into the aerial image sequence of the traffic accident site, operate the unmanned aerial vehicle to fly above a target object according to the partial three-dimensional site multilevel surrounding inclined shooting scheme firstly, and then shoot around the target object from top to bottom and from interior to exterior according to the four heights $H_1$, $H_2$, $H_3$ and $H_4$, and the four surrounding radiuses $R_1$, $R_2$, $R_3$ and $R_4$ on the principle that the target object is located at a view finding center, to obtain four groups of photographs with four heights and four radiuses.

* * * * *